(12) United States Patent
Lin et al.

(10) Patent No.: US 12,478,794 B2
(45) Date of Patent: Nov. 25, 2025

(54) PLASMA DEVICE FOR SKIN TREATMENT

(71) Applicant: Longyi Bio-Medical Technology Ltd., Kaohsiung (TW)

(72) Inventors: Che-hsin Lin, Kaohsiung (TW); Yao-hsien Wang, Kaohsiung (TW)

(73) Assignee: Longyi Bio-Medical Technology Ltd., Kaohsiung (TW)

( * ) Notice: Subject to any disclaimer, the term of this patent is extended or adjusted under 35 U.S.C. 154(b) by 192 days.

(21) Appl. No.: 18/238,546

(22) Filed: Aug. 28, 2023

(65) Prior Publication Data

US 2024/0075308 A1  Mar. 7, 2024

(30) Foreign Application Priority Data

Sep. 6, 2022 (TW) ................... 111133785

(51) Int. Cl.
*A61N 1/44* (2006.01)
*H05H 1/46* (2006.01)

(52) U.S. Cl.
CPC .............. *A61N 1/44* (2013.01); *H05H 1/4645* (2021.05); *H05H 2245/34* (2021.05)

(58) Field of Classification Search
None
See application file for complete search history.

(56) References Cited

U.S. PATENT DOCUMENTS

| | | | | |
|---|---|---|---|---|
| 6,923,890 | B2* | 8/2005 | Ricatto | B01J 19/088 8/115.52 |
| 8,361,276 | B2* | 1/2013 | Selwyn | H01J 37/32596 156/345.43 |
| 8,800,485 | B2* | 8/2014 | Selwyn | H01J 37/32825 118/723 ER |
| 9,006,976 | B2* | 4/2015 | Watson | H05H 1/46 315/111.21 |
| 9,498,637 | B2* | 11/2016 | Sanders | H05H 1/2441 |
| 9,521,736 | B2* | 12/2016 | Jacofsky | A61N 1/44 |
| 9,572,241 | B1* | 2/2017 | Eckert | H05H 1/2406 |
| 9,656,095 | B2* | 5/2017 | Watson | A61N 1/44 |
| 9,826,618 | B2* | 11/2017 | Eckert | A61B 18/042 |
| 10,039,927 | B2* | 8/2018 | Watson | H01J 37/32348 |
| 10,765,850 | B2* | 9/2020 | Kalghatgi | A61K 9/0021 |
| 11,102,877 | B2* | 8/2021 | Eckert | A61L 2/0011 |
| 11,123,446 | B2* | 9/2021 | Louis | C02F 1/4608 |
| 11,389,171 | B2* | 7/2022 | Goldsmith | A61B 17/3468 |
| 11,490,947 | B2* | 11/2022 | Winkelman | A61K 8/046 |

(Continued)

*Primary Examiner* — Srinivas Sathiraju

(57) ABSTRACT

The present invention provides a plasma device for skin repair, which includes a plasma head, a power supply, a gas supply source, and a control box. The plasma head includes an inner sleeve and an outer sleeve which are sleeved together. The inner sleeve has a first bottom portion having several first through holes. The outer sleeve has a second bottom portion having several second through holes. A gap is formed between the first bottom portion and the second bottom portion. The power supply is configured to provide 13.56 MHz to 54 MHz radio frequency power to generate a discharge in the gap. The gas supply source is configured to provide reaction gas into the gap, and plasma is formed by the reaction gas under the discharge. The control box is configured to control operating parameters of the plasma head, the power supply, and the gas supply source.

10 Claims, 4 Drawing Sheets

(56) References Cited

U.S. PATENT DOCUMENTS

| | | | |
|---|---|---|---|
| 12,064,160 B2* | 8/2024 | Winkelman | A61K 8/046 |
| 12,069,793 B2* | 8/2024 | Eckert | A61B 18/042 |
| 12,080,517 B2* | 9/2024 | Kobayashi | H01J 37/32183 |
| 2003/0129107 A1* | 7/2003 | Denes | H01J 37/32009 |
| | | | 422/186.21 |
| 2003/0168009 A1* | 9/2003 | Denes | H01J 37/32743 |
| | | | 156/345.43 |
| 2009/0121638 A1* | 5/2009 | Price | H05H 1/46 |
| | | | 315/111.21 |
| 2009/0122941 A1* | 5/2009 | Engemann | H05H 1/2475 |
| | | | 376/145 |
| 2009/0200948 A1* | 8/2009 | Selwyn | H01J 37/32082 |
| | | | 315/111.21 |
| 2010/0286791 A1* | 11/2010 | Goldsmith | A61B 17/12022 |
| | | | 604/524 |
| 2011/0018444 A1* | 1/2011 | Pouvesle | H05H 1/2406 |
| | | | 315/111.21 |
| 2011/0045205 A1* | 2/2011 | Rostaing | H05H 1/46 |
| | | | 118/723 AN |
| 2013/0053762 A1* | 2/2013 | Rontal | A61B 1/015 |
| | | | 604/24 |
| 2013/0064710 A1* | 3/2013 | Jacob | H01J 37/32 |
| | | | 422/186.21 |
| 2013/0072858 A1* | 3/2013 | Watson | A61M 15/02 |
| | | | 604/23 |
| 2013/0134878 A1* | 5/2013 | Selwyn | H01J 37/32082 |
| | | | 315/111.21 |
| 2014/0163664 A1* | 6/2014 | Goldsmith | A61B 17/0057 |
| | | | 604/93.01 |
| 2014/0199756 A1* | 7/2014 | Ish-Yamini Tomer | H05H 1/24 |
| | | | 405/128.7 |
| 2015/0343231 A1* | 12/2015 | Sanders | A61L 2/0011 |
| | | | 607/2 |
| 2016/0264274 A1* | 9/2016 | Kulaga | H01J 37/32394 |
| 2016/0271411 A1* | 9/2016 | Hummel | A61N 1/44 |
| 2017/0106200 A1* | 4/2017 | Sanders | A61L 2/14 |
| 2017/0128117 A1* | 5/2017 | Myers | H05H 1/2441 |
| 2017/0326347 A1* | 11/2017 | Kalghatgi | A61N 1/44 |
| 2018/0130646 A1* | 5/2018 | Louis | B01J 19/1887 |
| 2018/0214586 A1* | 8/2018 | Louis | H01J 37/32348 |
| 2019/0374213 A1* | 12/2019 | Goldsmith | A61M 27/008 |
| 2021/0145445 A9* | 5/2021 | Goldsmith | A61B 17/12181 |
| 2021/0283290 A1* | 9/2021 | Vandermeulen | A61L 2/0094 |
| 2022/0051874 A1* | 2/2022 | Kusunoki | H01J 37/32091 |
| 2022/0362534 A1* | 11/2022 | Goldsmith | A61K 9/16 |
| 2023/0012949 A1* | 1/2023 | Laubscher | A61N 1/44 |
| 2023/0126911 A1* | 4/2023 | Uchitel | H05H 1/01 |
| | | | 604/20 |
| 2023/0285630 A1* | 9/2023 | Short | A61L 26/008 |
| 2024/0023224 A1* | 1/2024 | Yanovitz | H05H 1/4645 |
| 2024/0075308 A1* | 3/2024 | Lin | A61N 1/44 |
| 2025/0104974 A1* | 3/2025 | Ikeda | H01J 37/32238 |

* cited by examiner

PLASMA DEVICE FOR SKIN TREATMENT

CROSS-REFERENCE TO RELATED APPLICATIONS

This application claims priority to Taiwan Application Serial Number 111133785, filed on Sep. 6, 2022, which is incorporated herein by reference.

FIELD OF INVENTION

The invention relates to a plasma device, in particular to a plasma device for skin repair.

BACKGROUND OF INVENTION

Using plasma to repair skin is one of the increasingly mature and common beauty techniques. At present, plasma generators used for beauty industries generate plasma by dielectric discharging. In such plasma generators, a glass tube is used as a dielectric, and a pair of electrodes are disposed inside or outside the glass tube and high voltage alternating current is applied to the electrodes to form plasma therebetween. However, such kind of plasma generators are likely to generate plasma flames, and the plasma flames would conduct the high voltage alternating current, thus leading to a discharge generation outside the device, causing an electric shock to operators or users, or skin burn due to a local discharge. In addition, the plasma area generated by this kind of dielectric plasma generators is mostly less than 1 centimeter in diameter, so it can only treat the skin in a small area. For the skin that needs to be treated on a large area, using such dielectric plasma generators takes more time and the uniformity generated by such dielectric plasma generators is not good.

Therefore, it is necessary to provide a plasma device for skin repair to solve the problems existing in the conventional technology.

SUMMARY OF INVENTION

One object of the present invention is to provide a plasma device for skin repair, which can generate uniform and large-area low-temperature and normal-pressure plasma. Moreover, the exterior of the plasma device is formed by a conductive metal for grounding, so there is no risk of high-voltage electric discharge to the outside, which can increase the operation speed, improve the safety of the user, and increase the skin repairing effect.

According to the aforementioned object, a plasma device for skin repair is provided. The plasma device for skin repair includes a plasma head, a power supply, a gas supply source, and a control box. The plasma head includes an inner sleeve and an outer sleeve. The inner sleeve has a first bottom portion, and there are a plurality of first through holes disposed on the first bottom portion. The outer sleeve is sleeved outside the inner sleeve. The outer sleeve has a second bottom portion, and there is a gap formed between the second bottom portion and the first bottom portion. A plurality of second through holes are disposed on the second bottom portion. The power supply is electrically connected to the plasma head. The power supply is configured to provide a radio frequency power of 13.56 MHz to 54 MHz to generate a discharge in the gap. The gas supply source is connected to the plasma head, wherein the gas supply source is configured to provide reaction gas into the gap, and plasma is formed by the reaction gas through the discharge. The control box is connected to the power supply and the gas supply source, and the control box is configured to control a plurality of operating parameters of the plasma head, the power supply, and the gas supply source.

According to an embodiment of the present invention, the discharge is generated under a normal pressure environment.

According to an embodiment of the present invention, the first through holes, the second through holes and the gap are communicated to each other.

According to an embodiment of the present invention, the distribution area of the second through holes on the second bottom portion of the outer sleeve defines an effective area, and the effective area is larger than or equal to 6 square centimeters.

According to an embodiment of the present invention, the outer sleeve and the inner sleeve are respectively integrally formed in a U-shaped structure.

According to an embodiment of the present invention, the first bottom portion and the second bottom portion are parallel to each other, and the gap is less than 1.0 mm.

According to an embodiment of the present invention, the plasma head further comprises an integrated base. The inner sleeve and the outer sleeve are disposed at the bottom of the integrated base, and a wire of the power supply and a gas pipeline of the gas supply source are arranged on the top of the integrated base.

According to an embodiment of the present invention, the wire is fixed on the top of the integrated base through a connector, and a conductive rod is disposed on the connector. The conductive rod extends in an inner space of the integrated base and is electrically connected to the inner sleeve through a conductive plate.

According to an embodiment of the present invention, an insulating sleeve is arranged between the inner sleeve and the outer sleeve, and the insulating sleeve is configured to block the conductive plate from contacting with the outer sleeve.

According to an embodiment of the present invention, the plasma head further includes a deflector which is arranged around a bottom edge of the outer sleeve.

According to an embodiment of the present invention, the plasma device for skin repair further includes a signal tuner disposed in an inner space of the plasma head.

According to the aforementioned embodiments of the present invention, the plasma device for skin repair provided by the present invention employs 13.56 MHz to 54 MHz high-frequency radio frequency to generate discharge in a normal pressure environment to form the reaction gas into a uniform plasma without filamentary discharge. In addition, the structural design of the plasma head of the present invention makes it possible to stably generate large-area, low-pressure plasma with a temperature lower than 45 degrees, so as to achieve the effect of promoting skin repair without damaging the skin of the organism caused by the contact of the plasma flame or electric shock.

DETAILED DESCRIPTION OF PREFERRED EMBODIMENTS

In order to make the above and other objects, features, and advantages of the present invention more comprehensible, preferred embodiments of the present invention will be described below in detail together with the attached drawings. Furthermore, the directional terms used in the present invention, for example, up, down, top, bottom, front, back, left, right, inside, outside, side, around, central, horizontal, transverse, vertical, longitudinal, axial, radial direction, the uppermost layer, or the lowermost layer, etc. are only the directions shown in the attached drawings. Therefore, the directional terms are only used to illustrate and express the present invention, but not to limit the present invention.

Figure 1:
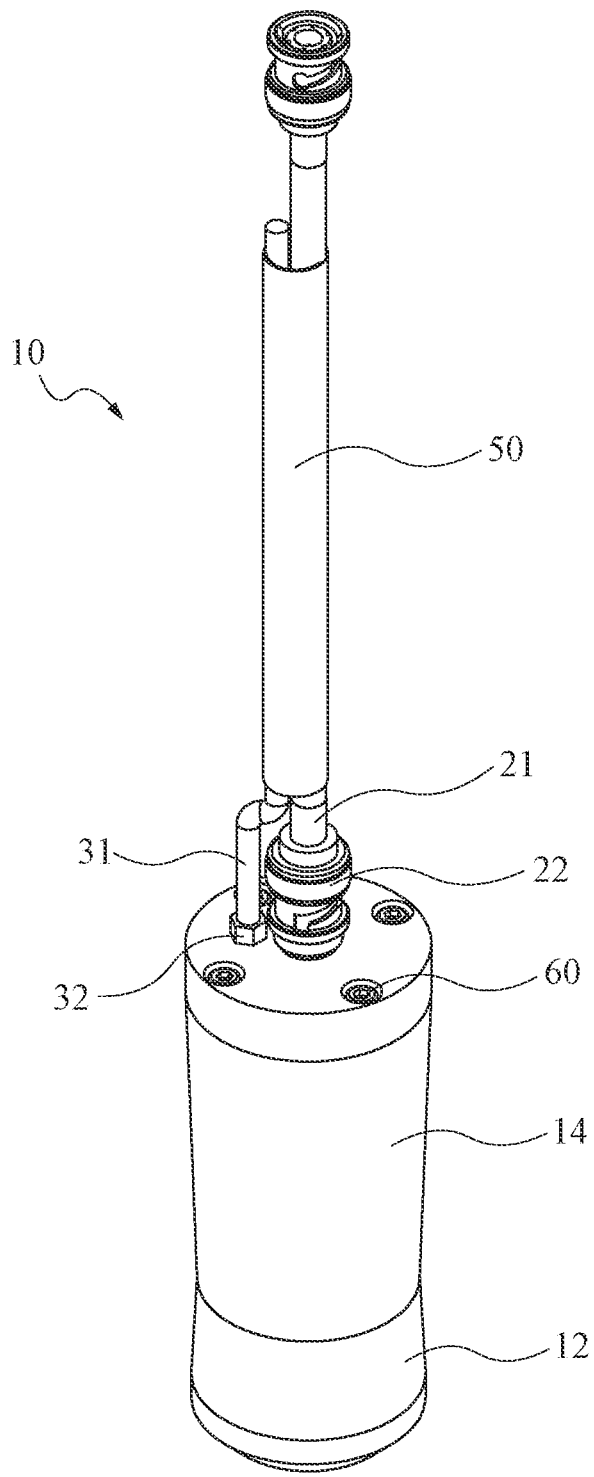
FIG. 1 is a perspective view of a plasma head according to an embodiment of the present invention.
Figure 2:
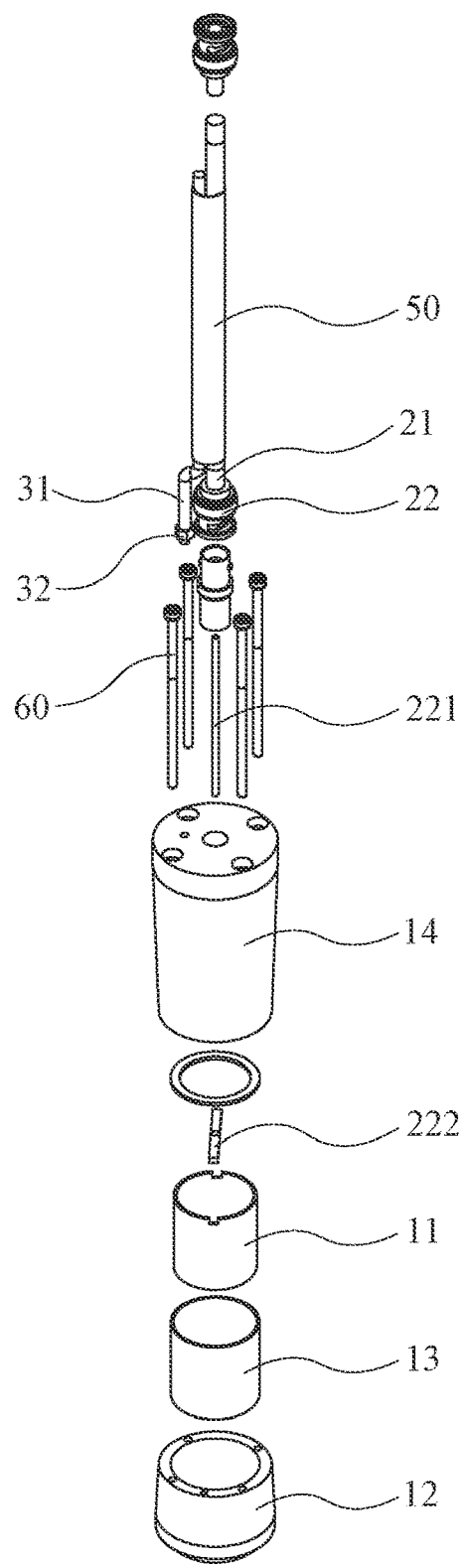
FIG. 2 is an exploded view of a plasma head according to an embodiment of the present invention.
Figure 3:
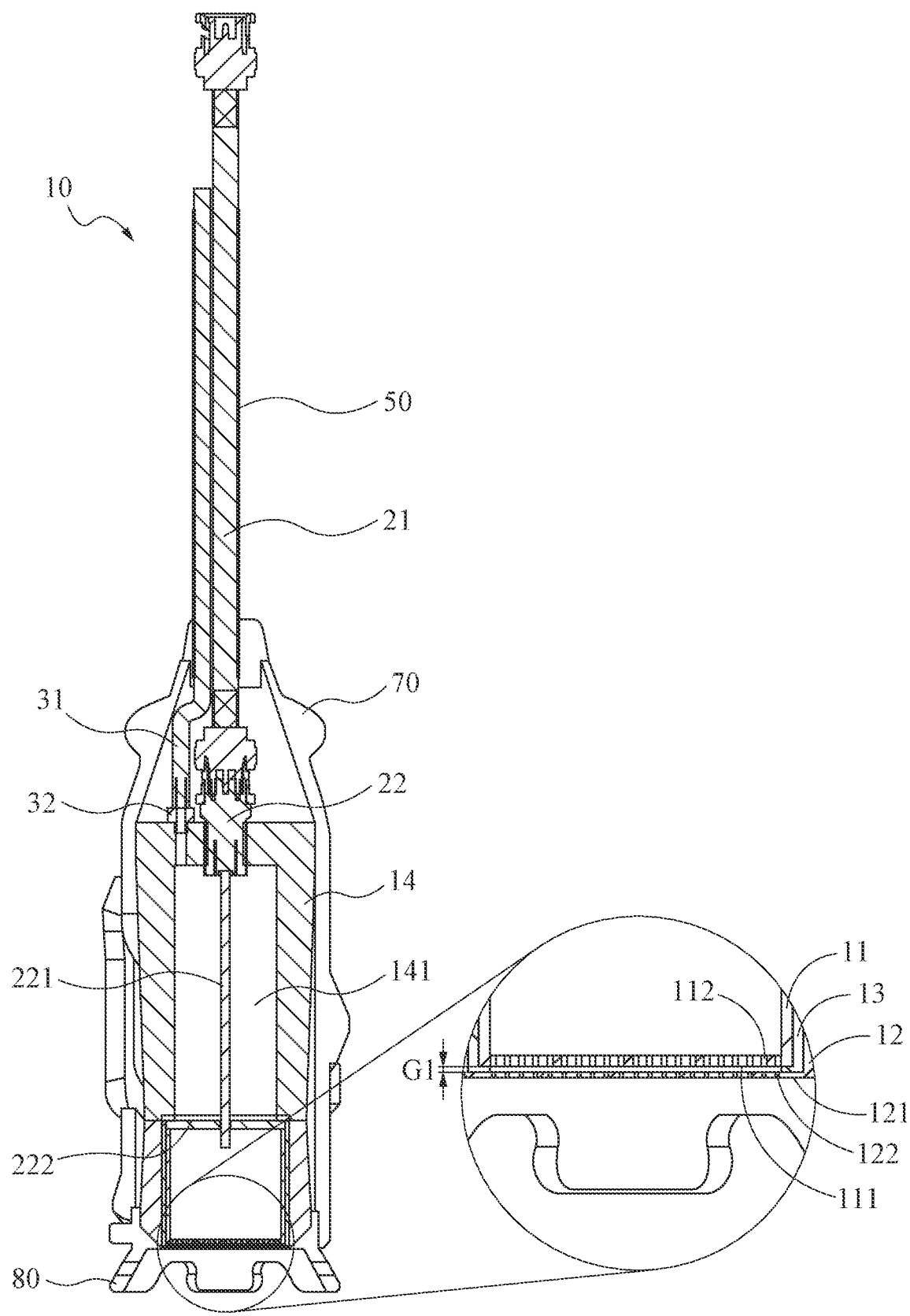
FIG. 3 is a cross-sectional view of a plasma head equipped with a deflector according to an embodiment of the present invention.
Figure 4:
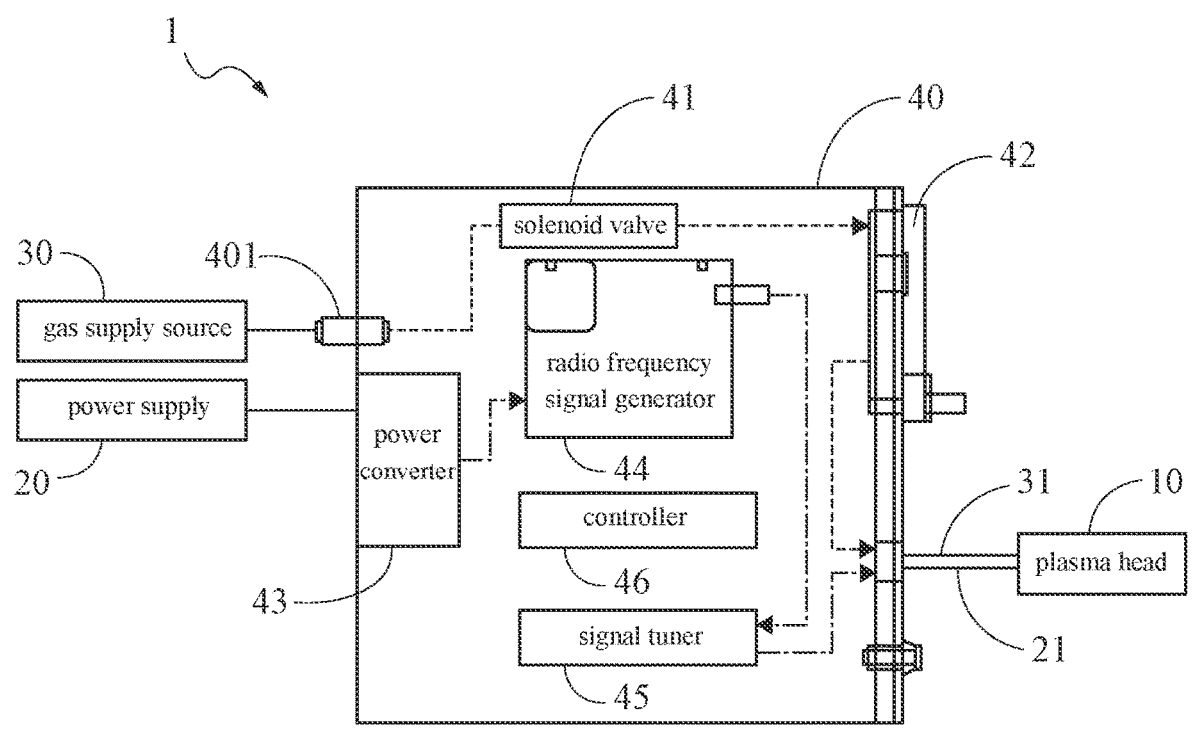
FIG. 4 is a block diagram illustrating a plasma device for skin repair according to an embodiment of the present invention.

Simultaneously referring to FIG. 1 to FIG. 4, FIG. 1 and FIG. 2 are respectively showing a perspective view and an exploded view of a plasma head 10 according to an embodiment of the present invention, and FIG. 3 is a cross-sectional view of the plasma head 10 equipped with a deflector according to an embodiment of the present invention, and FIG. 4 is a block diagram illustrating a plasma device 1 for skin repair according to an embodiment of the present invention. As shown in FIG. 4, the plasma device 1 for skin repair of the present invention includes the plasma head 10, a power supply 20, a gas supply source 30 and a control box 40. The power supply 20 is configured to provide a radio frequency (RF) signal of 13.56 MHz to 54 MHz to the plasma head 10, and the gas supply source 30 is configured to provide reaction gas to the plasma head 10. The plasma head 10 can use the radio frequency signal and the reaction gas to generate plasma. The control box 40 is used to control plural operating parameters of the plasma head 10, the power supply 20 and the gas supply source 30. In this way, the plasma device 1 for skin repair of the present invention can generate uniform and large-area low-temperature plasma under a normal pressure, which can directly contact the skin of the organism to stimulate and activate the fibroblasts of the organism to promote skin repair.

As shown in FIG. 2 and FIG. 3, in the present embodiment, the plasma head 10 includes an inner sleeve 11, an outer sleeve 12, an insulating sleeve 13 and an integrated base 14. The inner sleeve 11 and the outer sleeve 12 are used as electrodes for plasma generation and can be made of conductors. The outer sleeve 12 is grounded to prevent electric discharge. Specifically, the outer sleeve 12 is put around the inner sleeve 11, and the inner sleeve 11 is electrically connected to the power supply 20, and the outer sleeve 12 is grounded. In this way, the radio frequency power provided by the power supply 20 can generate a discharge between the outer sleeve 12 and the inner sleeve 11. The insulating sleeve 13 is disposed between the inner sleeve 11 and the outer sleeve 12, and the insulating sleeve 13 is configured to block the inner sleeve 11 from contacting the outer sleeve 12. In the present embodiment, the discharge is generated under a normal pressure (about 1 atm). It should be emphasized that the frequencies of the radio frequency signal provided by the power supply 20 are preferably 13.56 MHz, 27.0 MHz to 54 MHz, which are conducive to uniform generation of plasma between the inner sleeve 11 and the outer sleeve 12. If other frequencies than 13.56 MHz, 27.0 MHz to 54 MHz are employed, they do not meet the specifications of current industry. Although plasma can be generated by other frequencies than 13.56 MHz, 27.0 MHz to 54 MHz, it's likely to cause radio communication interference. If the frequency lower than, for example, 1.0 MHz, is employed, filamentary discharge like lightning is likely to occur, thus resulting in the reduction the effective plasma concentration as well as burned plasma head 10 due to the local elevated temperature. In addition, if the frequency higher than 54 MHz is employed, in addition to radio signal communication interference, it will also cause the signal to be attenuated quickly, thus making it difficult to generate plasma. One feature of the present invention is that the plasma is generated between the inner and outer sleeves, and the outer sleeve is grounded, and ionized gas molecules of plasma are released through the holes of the outer sleeve as afterglow discharge plasma. Therefore, the electrical signal is completely isolated in the sleeve, and there is no risk of electric shock to the user, which can greatly improve the usage safety.

As shown in FIG. 3, the inner sleeve 11 has a first bottom portion 111, and the first bottom portion 111 is provided with plural first through holes 112. Similarly, the outer sleeve 12 has a second bottom portion 121, and the second bottom portion 121 is provided with plural second through holes 122. The first bottom portion 111 of the inner sleeve 11 and the second bottom portion 121 of the outer sleeve 12 are parallel to each other with a gap G1 between them, and the gap G1 is less than 1.0 mm. In one embodiment, the inner sleeve 11 and the outer sleeve 12 are respectively integrally formed in a U-shaped structure, and the first through holes 112 are directly formed on a bottom surface of the U-shaped structure of the inner sleeve 11, and the second through holes are directly formed on a bottom surface of the U-shaped structure of the outer sleeve 12. The integrally formed U-shaped structures are not only easy to manufacture and process, but also conducive to keeping the first bottom 111 of the inner sleeve 11 and the second bottom 121 of the outer sleeve 12 parallel to each other when the inner sleeve 11 and the outer sleeve 12 are sleeved together.

As shown in FIG. 2 and FIG. 3, the integrated base 14 is used to integrate a wire 21 of the power supply 20 and a gas pipeline 31 of the gas supply source 30, so as to simplify the connection between the plasma head 10 and the power supply 20 and the gas supply source 30 respectively. Specifically, the wire 21 of the power supply 20 and the gas pipeline 31 of the gas supply source 30 can be integrated into a bundle through a sleeve 50 and be connected to the top of the integrated base 14. The wire 21 of the power supply 20 can be fixed on the top of the integrated base 14 through a connector 22. In some examples, the connector 22 may be a high-frequency SMA (Sub Miniature version A) connector, BNC (Bayonet Neill-Concelman) or TNC (Threaded Neill-Concelman), or other special connectors for high-frequency signals. The gas pipeline 31 of the gas supply source 30 can be fixed on the top of the integrated base 14 through a gas quick connector 32. As shown in FIG. 3, the connector 22 is provided with a conductive rod 221 extending in an inner space 141 of the integrated base 14, and the conductive rod 221 is electrically connected to the top edge of the inner sleeve 11 through a conductive plate 222. The insulating sleeve 13 is put around the conductive plate 222 and the inner sleeve 11 to prevent the conductive plate 222 from directly contacting the outer sleeve 12. The gas pipeline 31 of the gas supply source 30 is communicated with the inner space 141 of the integrated base 14 through the gas quick connector 32.

Referring to FIG. 2 and FIG. 3 again, the inner sleeve 11 and the outer sleeve 12 are disposed at the bottom of the integrated base 14. Specifically, for example, plural fixing members 60 (such as screws) shown in FIG. 2 can be used to pass through the integrated base 14 longitudinally and fixed into the outer sleeve 12, so as to fix the sleeved inner sleeve 11 and outer sleeve on the bottom of integrated base 14. In one embodiment, the first through holes 112, the second through holes 122 and the gap G1 are communicated with each other. In this way, the reaction gas provided by the gas supply source 30 can enter the inner space 141 of the integrated base 14 via the gas pipeline 31, and then enter the gap G1 through the first through holes 112 to form plasma via the discharge. After the plasma is formed, the plasma may be ejected to the outside of the plasma head 10 through the second through holes 122. In the present embodiment, high-frequency oscillatory discharge can be generated between the inner sleeve 11 and the outer sleeve 12 by using a high-frequency RF power supply to increase the overall collision effect, so that the discharge can be generated uniformly in a large area. In one embodiment, a distribution area of the second through holes 122 on the second bottom portion 121 of the outer sleeve 12 defines an effective area, and the effective area is greater than or equal to 6 cm$^2$. That is to say, the plasma ejected from the plasma head 10 covers an area greater than or equal to 6 cm$^2$, which can improve the scanning efficiency of the plasma head 10 on the skin. In one example, the second bottom portion 121 of the outer sleeve 12 has a circular cross section, and the diameter of the effective area may be 30 mm to 100 mm.

In one embodiment, as shown in FIG. 4, the operations of the power supply 20 and the gas supply source 30 can be respectively controlled by the control box 40. Specifically, the control box 40 includes a solenoid valve 41 and a flow meter 42. As indicated by the dashed line path in FIG. 4, the reaction gas supplied by the gas supply source 30 can enter the control box 40 from the gas inlet 401 of the control box 40, and then enter the plasma head 10 through the gas pipeline 31 after its flow rate is adjusted by the solenoid valve 41 and the flow meter 42. In one example, the reaction gas may be helium or formulation gas. In addition, the control box 40 further includes a power converter 43, a radio frequency signal generator 44, and a signal tuner 45. After the AC power provided by the power supply 20 is converted into DC by the power converter 43, radio frequency signal with desired frequency is generated by the radio frequency signal generator 44 and the signal tuner 45 and then provided to the plasma head 10 through the wire 21 (as indicated by the one-dot chain line path in FIG. 4). In one embodiment, the frequency of the radio frequency signal provided to the plasma head 10 through the control box 40 is 13.56 MHz to 54 MHz. In the present embodiment, the control box 40 has a controller 46, and the controller 46 is configured to control all operating parameters of the control box 40 according to user settings. In other embodiments, if the internal space of the plasma head 10 is sufficient, the signal tuner 45 can be disposed inside the plasma head 10 to reduce cost and improve performance.

Referring to FIG. 3 again, in one embodiment, the plasma head 10 further includes a casing 70 and a deflector 80. The casing 70 covers the outer sleeve 12 and the integrated base 14. Moreover, the casing 70 is used to accommodate and support a portion of the wire 21 that is connected to the connector 22 and a portion of the gas pipeline 31 that is connected to the gas quick connector 32, so as to strengthen the structural stability of the wire 21 as well as the gas pipeline 31. The deflector 80 is disposed at the bottom of the casing 70 and surrounds the bottom edge of the outer sleeve 12. The deflector 80 is used to guide the plasma to the skin surface and to keep a constant distance between the outer sleeve 12 and the skin, so as to improve the operational stability of the plasma head 10. In an example, the deflector 80 is replaceable, which is beneficial to keep the sanitation of the plasma head 10.

According to the aforementioned embodiments of the present invention, the plasma device for skin repair provided by the present invention utilizes 13.56 MHz to 54 MHz high-frequency radio frequency to generate discharge in a normal pressure environment to form the reaction gas into plasma. In addition, the structural design of the plasma head of the present invention can stably generate large-area, low-pressure plasma with a temperature lower than 45 degrees, so as to achieve the effect of promoting skin repair without damaging the skin of the organism. On the other hand, compared with the traditional plasma generated by dielectric discharge using 15 kHZ to 40 kHZ low-frequency alternating current, the present invention uses the principle of afterglow discharge to generate uniform large-area plasma, so there will be no problems such as electric shock or other damage to the skin caused by the plasma flame generated by the traditional dielectric discharge.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

The invention claimed is:

1. A plasma device for skin treatment, comprising:
 a plasma head comprising:
  an inner sleeve having a first bottom portion, wherein a plurality of first through holes are disposed on the first bottom portion; and
  an outer sleeve sleeved outside the inner sleeve, wherein the outer sleeve has a second bottom portion, and a gap is formed between the second bottom portion and the first bottom portion, and wherein a plurality of second through holes are disposed on the second bottom portion;
  wherein the inner sleeve and the outer sleeve are each formed as conductive structures that are coaxially arranged, and the first bottom portion and the second bottom portion are parallel to each other;
 a power supply electrically connected to the plasma head, wherein the power supply is configured to provide a radio frequency power of 13.56 MHz to 54 MHz to generate a discharge in the gap;
 a gas supply source connected to the plasma head, wherein the gas supply source is configured to provide reaction gas into the gap, and plasma is formed by the reaction gas through the discharge; and
 a control box connected to the power supply and the gas supply source, wherein the control box is configured to control a plurality of operating parameters of the plasma head, the power supply, and the gas supply source;
 wherein the plasma head further comprises an integrated base, wherein the integrated base is comprising a metal and electrically connected to the ground, the inner sleeve and the outer sleeve are disposed at the bottom of the integrated base and are electrically separated from ground, and a wire of the power supply and a gas pipeline of the gas supply source are arranged on the top of the integrated base.

2. The plasma device for skin treatment according to claim 1, wherein the discharge is generated under a normal pressure environment.

3. The plasma device for skin treatment according to claim 1, wherein the first through holes, the second through holes and the gap are communicated to each other.

4. The plasma device for skin treatment according to claim 1, wherein the distribution area of the second through holes on the second bottom portion of the outer sleeve defines an effective area, wherein the effective area is larger than or equal to 6 square centimeters.

5. The plasma device for skin treatment according to claim 1, wherein the outer sleeve and the inner sleeve are respectively integrally formed in a U-shaped structure.

6. The plasma device for skin treatment according to claim 1, wherein the gap is less than 1.0 mm.

7. The plasma device for skin treatment according to claim 1, wherein the wire is fixed on the top of the integrated base through a connector, and a conductive rod is disposed on the connector, and wherein the conductive rod extends in an inner space of the integrated base and is electrically connected to the inner sleeve through a conductive plate.

8. The plasma device for skin treatment according to claim 7, wherein an insulating sleeve is arranged between the inner sleeve and the outer sleeve, and the insulating sleeve is configured to block the conductive plate from contacting with the outer sleeve.

9. The plasma device for skin treatment according to claim 1, wherein the plasma head further comprises a deflector arranged around a bottom edge of the outer sleeve.

10. The plasma device for skin treatment according to claim 1, further comprises a signal tuner disposed in an inner space of the plasma head.

* * * * *